United States Patent [19]

Keckler et al.

[11] Patent Number: 4,759,001
[45] Date of Patent: Jul. 19, 1988

[54] TERMINATION APPARATUS FOR A MARINE STREAMER EMPLOYING A FLEXIBLE LOAD BEARING OUTER HOSEWALL

[75] Inventors: William G. Keckler; Robert G. Zachariadis, both of Dallas; Gary T. Griffin, Millican, all of Tex.

[73] Assignee: Mobil Oil Corporation, New York, N.Y.

[21] Appl. No.: 31,057

[22] Filed: Mar. 27, 1987

[51] Int. Cl.⁴ ............................................. G01V 1/38
[52] U.S. Cl. ..................................... 367/191; 367/15; 24/129 R; 24/129 W; 174/101.5; 174/24; 439/320
[58] Field of Search ......................... 114/242, 249, 253; 174/22 R, 22 S, 23 R, 24, 70 S, 101.5; 181/110, 111, 112, 140, 141; 137/81.2, 118, 119; 439/320, 321, 322, 323; 367/15-24, 106, 130, 141, 144, 153, 154, 159, 162, 165, 167, 169, 171, 172, 173, 176, 177, 191; 340/850; 285/245; 24/115 R, 129 R, 129 W

[56] References Cited

U.S. PATENT DOCUMENTS

| | | | |
|---|---|---|---|
| 2,828,473 | 3/1958 | High | 439/323 |
| 3,299,391 | 1/1967 | Herrmann et al. | 439/94 |
| 3,319,734 | 5/1967 | Pavey, Jr. | 367/154 |
| 3,371,739 | 3/1968 | Pearson | 367/18 |
| 3,376,948 | 4/1968 | Morrow | 181/0.5 |
| 3,381,082 | 4/1968 | Peterson | 174/22 R |
| 3,506,085 | 4/1970 | Loper | 367/144 |
| 3,518,677 | 6/1970 | Florian | 367/154 |
| 3,696,329 | 10/1972 | Hazelhurst | 367/154 |
| 4,146,870 | 3/1979 | Ruehle | 367/20 |
| 4,204,188 | 5/1980 | Weichart et al. | 367/154 |
| 4,317,185 | 2/1982 | Thigpen et al. | 174/101.5 |
| 4,581,724 | 4/1986 | Zachariadis | 367/21 |

Primary Examiner—Deborah L. Kyle
Assistant Examiner—Brian S. Steinberger
Attorney, Agent, or Firm—Alexander J. McKillop; Michael G. Gilman; George W. Hager, Jr.

[57] ABSTRACT

A hosewall terminating apparatus for a streamer section utilizing a load bearing flexible hosewall includes an inner sleeve having radially extending outward protrusions and an outer sleeve having radially extending inward protrusions. With the inner sleeve positioned within the outer sleeve, the radial distance between ends of these protrusions are spaced-apart to provide a gap for the position of the flexible hosewall of the streamer section. The hosewall of the streamer section is secured between these protrusions and the sleeve surfaces when the outer sleeve is reduced in diameter by swaging.

1 Claim, 2 Drawing Sheets

1

TERMINATION APPARATUS FOR A MARINE STREAMER EMPLOYING A FLEXIBLE LOAD BEARING OUTER HOSEWALL

BACKGROUND OF THE INVENTION

This invention relates to marine seismic exploration and, more particularly, to an apparatus for terminating an outer hosewall, such as is used in a marine seismic streamer, where such a hosewall is load bearing and flexible.

In conducting a marine seismic survey, a seismic energy source is employed by an exploration vessel to generate a seismic signal, referred to as a seismic pressure wave, which is transmitted through the water layer into the subsurface formations. A portion of the signal is reflected from the subsurface reflecting interfaces back to the water layer where it is received by a seismic streamer being towed behind the exploration vessel. The streamer is comprised of a plurality of sections connected together. Each section has a flexible outer hosewall, made of material such as polyurethane, for housing a plurality of hydrophones which generate electrical signals in response to the received seismic signals. The hydrophones are spread along the length of the streamer sections and are electrically connected through the streamer to seismic recording instruments on board the exploration vessel. Such a marine seismic survey may be typically carried out with the exploration systems of the type described in U.S. Pat. No. 4,146,870 to W. H. Ruehle and U.S. Pat. No. 4,581,724 to R. G. Zachariadis wherein a seismic energy source and seismic streamer are towed through the water along a line of exploration.

SUMMARY OF THE INVENTION

In accordance with the present invention there is provided a hosewall terminating apparatus for a flexible hosewall streamer section with longitudinal load bearing members embedded in the hosewall. Such apparatus has an inner sleeve with a plurality of protrusions extending radially outwardly from a portion of its outer surface. An outer sleeve has a plurality of protrusions extending radially inward from a portion of its inner surface. The diameters of such inner and outer sleeves are such that the distance between the ends of the protrusions on each sleeve and the surfaces of the other sleeve is no greater than the thickness of the flexible hosewall of the streamer section. In this manner the flexible hosewall is secured between such protrusions when the hosewall is positioned between the inner and outer sleeves and the outer sleeve is then reduced in diameter by swaging.

In a specific aspect, the protrusions are circumferential about such sleeves and are positioned at alternating spaced-apart positions along the lengths of such sleeves.

In a more specific aspect, the inner sleeve is externally threaded along a first end and has a plurality of circumferential protrusions at spaced-apart positions along the outer surface of a second end. The outer sleeve is internally threaded along a first end and has a plurality of circumferential protrusions at spaced-apart positions along the inner surface of a second end. The inner and outer sleeves are threadably engageable along their first ends. Along the second ends of such sleeves there is a gap between the ends of the protrusions and the adjacent sleeve surfaces that is no greater than the thickness of the flexible hosewall of the steamer section such that the hosewall is secured between the second ends of the inner and outer sleeves when the inner sleeve is positioned within the outer sleeve by the threadable engagement of the first ends of such sleeves and the outer sleeve is then forceably reduced in diameter by swaging, thereby trapping and compressing the hosewall between the inner and outer sleeves.

In a further aspect, the first end of the outer sleeve is externally threaded so that the termination apparatus can be threadably engaged with an internally threaded connector. The outside diameters of the hosewall, the terminating apparatus after swaging, and the connector are the same so that there is a smooth outer surface along the length of their assembly.

In a still further aspect, at least a pair of anchors are affixed to spaced-apart circumferential positions about the second end of the inner sleeve. Strain members extending through the cable are attached to such anchors.

DESCRIPTION OF THE PREFERRED EMBODIMENT

Figure 1:
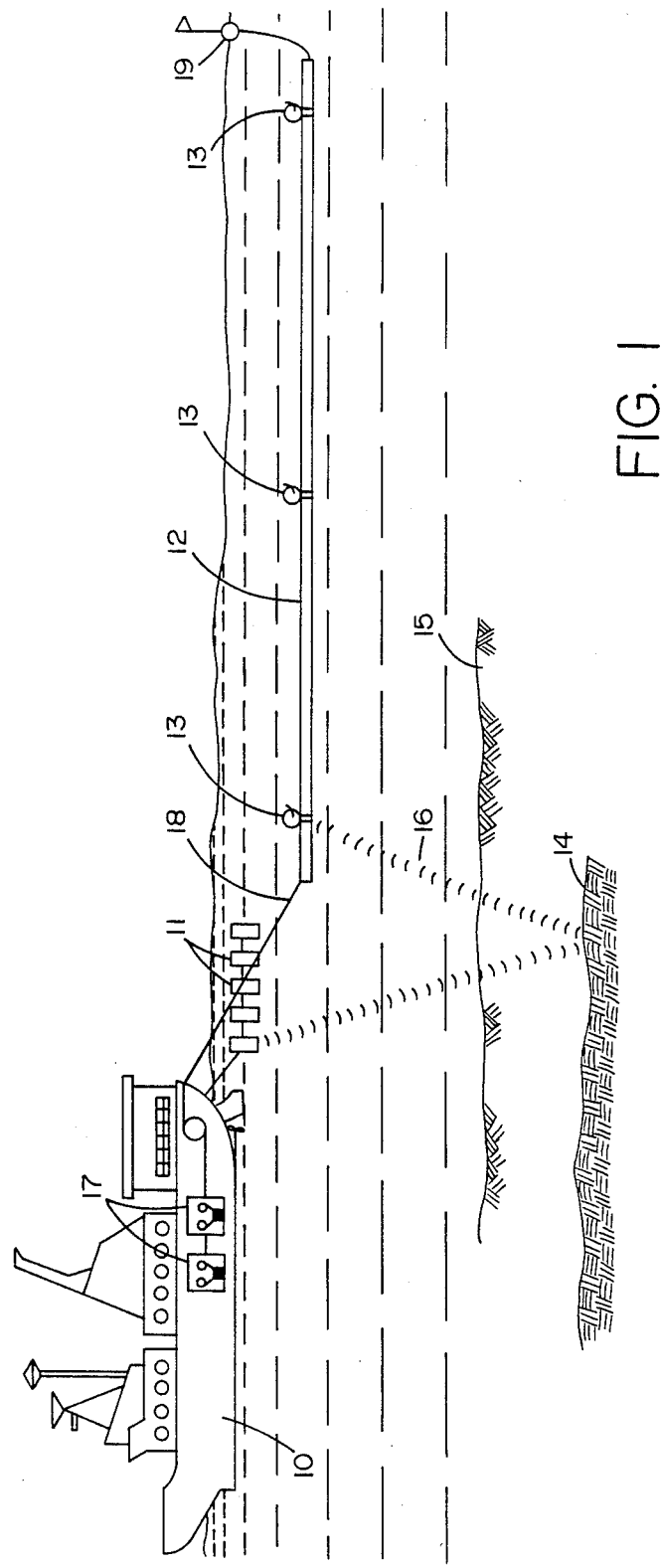
FIG. 1 illustrates a marine seismic exploration system with which the hosewall terminating apparatus of the present invention may be utilized.

Referring to FIG. 1, there will be described a marine seismic exploration system with which the hosewall terminating apparatus for a marine seismic streamer of the present invention may be employed. The seismic marine exploration vessel 10 traverses a line of exploration. The vessel 10 tows one or more seismic energy sources 11 and a seismic streamer 12 employing a plurality of hydrophones spaced along the length of the streamer. Seismic energy is generated in the water by the source 11 and reflections 16 of such energy from subsurface formations, such as illustrated at 14 below the water bottom 15, as detected by the plurality of hydrophones along the streamer 12 as seismic reflection signals. These seismic signals are transferred to data recording and processing equipment 17 on the vessel 10 by way of electrical wiring through streamer 12 and up streamer tow cable 18. FIG. 1 does not show conventional or state-of-the-art mechanical features housed within the steamer such as strain members, electrical cables, spacers, or even the hydrophones themselves. These features are clearly disclosed in numerous U.S. patents, for example, U.S. Pat. Nos. 3,299,397 and 3,319,734 to G. M. Pavey, Jr. et al.; U.S. Pat. No. 3,371,739 to R. H. Pearson and U.S. Pat. No. 4,204,188 to H. Weichart et al. The streamer 12 may additionally be provided with one or more depth control devices 13 and a tail bouy 19. A typical seismic energy source 11 used in marine seismic exploration may comprise one or more air guns of the type described in U.S. Pat. No. 3,506,085 to G. B. Loper. A typical data recording and processing system 17 is the Texas Instruments Model DFS-V Ditigal Field Recorder.

Typically, a plurality of spacers are positioned along the length of the seismic streamer for supporting the flexible outer hosewall of the seismic streamer. Such spacers are of generally cylindrical shape as shown in U.S. Pat. No. 3,518,677 to Florian and U.S. Pat. No. 3,696,329 to Hazelhurst.

Figure 2:
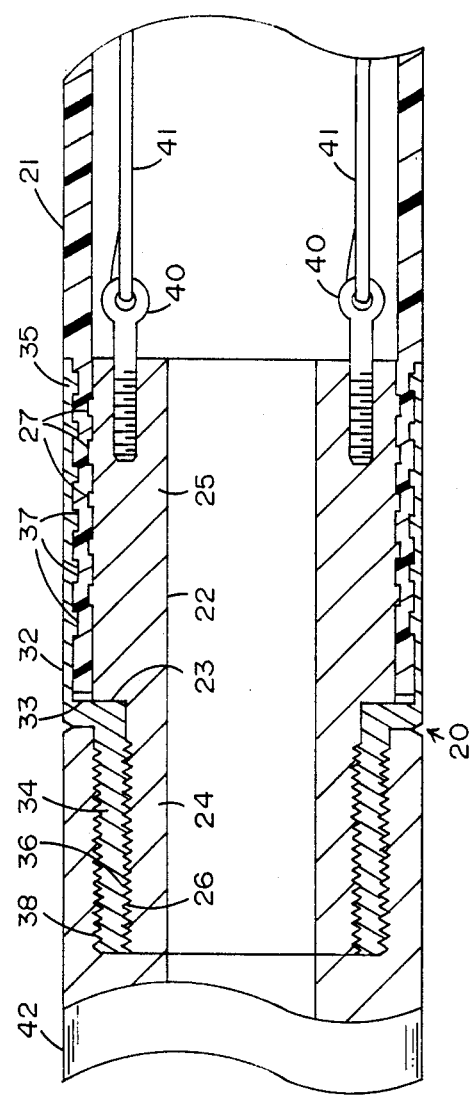
FIG. 2 is a longitudinal sectional view of the hosewall terminating apparatus of the present invention for use with the seismic marine streamer of FIG. 1.

Referring now to FIG. 2 there is shown the cable terminating apparatus 20 of the present invention for use with a flexible hosewall 21, such as used in the marine seismic streamer of FIG. 1. An inner sleeve 22 is recessed at 23 to form a first end 24 and a second end 25. First end 24 is provided with external threads 26 along its length while second end 25 is provided with a plurality of protrusions 27 located at spaced-apart positions along its length. An outer sleeve 32 is recessed at 33 to form a first end 34 and a second end 35. First end 34 is provided with internal threads 36 along its length while second end 35 is provided with a plurality of protrusions 37 located at spaced-apart positions along its length.

The outside and inside diameters of first ends 24 and 34 respectively of sleeves 22 and 32 are approximately the same so that sleeves 22 and 32 threadably engage when sleeve 22 is inserted into sleeve 32 to the point that recess 23 of inner sleeve 22 abuts with recess 33 of outer sleeve 32. With inner sleeve 22 so fully inserted within outer sleeve 32, the protrusions 27 along the length of the outer surface of sleeve 22 are alternately spaced from the protrusions 37 along the length of the inner surface of sleeve 32. The outside diameter of sleeve 22 along second end 25 and the inside diameter of sleeve 32 along end 35 are such as to provide a gap that is no greater than the thickmess of the flexible.

In affixing the hosewall 21 to the termination apparatus 20, the second end 25 of inner sleeve 22 is inserted into the flexible hosewall at least to a point past all of the projections 27. Then the second end 35 of outer sleeve 32 is placed over end 24 of inner sleeve 22 until second end 35 surrounds at least a portion of hosewall 21 and internal threads 36 of outer sleeve 32 engage the external threads of inner sleeve 22. At this point, outer sleeve 32 is rotated with respect to inner sleeve 22 so as to advance the second end of the outer sleeve 32 along the outer surface of the flexible hosewall of the streamer section 21 until recess 33 of outer sleeve 32 abuts with recess 23 of inner sleeve 22. In this manner the hosewall is positioned between the protrusions 27 and 37. The second end 35 of outer sleeve 32 is then swaged (i.e. shaped by compression) so as to firmly fix the hosewall 21 between the inner and outer sleeves 22 and 32. In a preferred embodiment the protrusions 27 and 37 are teeth-like members each of which extends circumferentially about its respective sleeves in ring-like manner.

Also shown in FIG. 2 are a pair of anchors 40 which are screwed into the second end 25 of inner sleeve 22.

The strain members 41 which pass through the interior of the hose 21 are attached to anchors 40 for providing emergency strain relief in the event that the hosewall 21 were to be pulled from between inner and outer sleeves 22 and 23 under loading conditions.

There is further shown in FIG. 2 an internally threaded end connector 42 to which the first end 34 of outer sleeve 32 is engaged by means of external threads 38. The combination of the termination apparatus 20 and the end connector 42 permits a plurality of streamer sections employing flexible hosewalls, such as are used in a marine seismic streamer, to be firmly connected together in series.

Even though one embodiment of the invention has been described herein, it will be apparent to those skilled in the art that various changes and modifications may be made without departing from the spirit and scope of the invention as set forth in the appended claims. Any such changes and modifications coming within the scope of such appended claims are intended to be included herein.

We claim:

1. Termination apparatus for a flexible hosewall streamer section, comprising:
    (a) an inner sleeve externally threaded along a first end and having a plurality of circumferential protrusions at spaced-apart positions along the outer surface of a second end;
    (b) an outer sleeve internally threaded along a first end and having a plurality of circumferential protrusions at spaced-apart positions along the inner surface of a second end;
    (c) the outer diameter of said inner sleeve and the inner diameter of said outer sleeve along said first ends being such that said inner sleeve is threadably engageable within said outer sleeve along said first ends; and
    (d) the outer diameter of said inner sleeve and the inner diameter of said outer sleeve along said second ends are such that there is a gap between said protrusions that is no greater than the thickness of said flexible hosewall streamer section when said inner and outer sleeves are threadably engaged along said first ends, said flexible hosewall streamer section being swaged between said protrusions on said inner and outer sleeves along the lengths of said second ends of said sleeves when said inner and outer sleeves are threadably engaged along said first ends.

* * * * *